United States Patent
Roskind

(10) Patent No.: US 9,544,153 B1
(45) Date of Patent: Jan. 10, 2017

(54) COMPRESSION OF CRYPTOGRAPHIC CHAINING CERTIFICATES

(71) Applicant: Google Inc., Mountain View, CA (US)

(72) Inventor: James Anthony Roskind, Redwood City, CA (US)

(73) Assignee: GOOGLE INC., Mountain View, CA (US)

( * ) Notice: Subject to any disclaimer, the term of this patent is extended or adjusted under 35 U.S.C. 154(b) by 45 days.

(21) Appl. No.: 14/070,397

(22) Filed: Nov. 1, 2013

Related U.S. Application Data

(60) Provisional application No. 61/863,277, filed on Aug. 7, 2013.

(51) Int. Cl.
  *H04L 9/32* (2006.01)
  *H04L 29/06* (2006.01)
  *H04L 9/00* (2006.01)

(52) U.S. Cl.
  CPC .......... *H04L 9/3265* (2013.01); *H04L 9/3268* (2013.01); *H04L 63/0428* (2013.01); *H04L 9/006* (2013.01); *H04L 2209/38* (2013.01)

(58) Field of Classification Search
  CPC .. H04L 63/0428; H04L 9/3265; H04L 9/3268; H04L 9/006; H04L 2209/38
  See application file for complete search history.

(56) References Cited

U.S. PATENT DOCUMENTS

| | | | | |
|---|---|---|---|---|
| 8,826,008 | B2 * | 9/2014 | Brown | H04L 63/0823 713/156 |
| 2003/0115457 | A1 * | 6/2003 | Wildish | H04L 9/3265 713/157 |
| 2003/0212888 | A1 * | 11/2003 | Wildish et al. | 713/158 |
| 2009/0249074 | A1 * | 10/2009 | Madhavan et al. | 713/176 |
| 2012/0072979 | A1 * | 3/2012 | Cha et al. | 726/7 |
| 2013/0298210 | A1 * | 11/2013 | Wright et al. | 726/7 |

OTHER PUBLICATIONS

John Broodkin, Google making the Web faster with protocol that reduces round trips, art technica, Jun. 28, 2013 (retrieved from http://arstechnica.com/information-technology/2013/06/google-making-the-web-faster-with-protocol-that-reduces-round-trips/ on Feb. 27, 2015, attached to the instant office action as Broodkin_06_28_2013.pdf).*

* cited by examiner

Primary Examiner — Jung Kim
Assistant Examiner — Thomas Ho
(74) Attorney, Agent, or Firm — McDermott Will & Emery LLP

(57) ABSTRACT

A method, system and computer-readable medium for establishing secure connections using compressed cryptographic chaining certificates, the method including receiving a first compact representation corresponding to a certificate for validating a first entity at a second entity, retrieving a local list of one or more compact representations corresponding to one or more certificates locally available to the second entity, comparing the first compact representation to the one or more compact representations within the local list, determining if the first compact representation matches at least one of the one or more compact representations, retrieving the certificate corresponding to the at least one of the one or more compact representations if the first compact representation matches the at least one of the one or more compact representations and validating the first entity using the retrieved certificate corresponding to the at least one of the one or more compact representations.

20 Claims, 4 Drawing Sheets

COMPRESSION OF CRYPTOGRAPHIC CHAINING CERTIFICATES

CROSS-REFERENCE TO RELATED APPLICATION

The present application claims the benefit of U.S. Provisional Patent Application Ser. No. 61/863,277, entitled "Compression of Cryptographic Chaining Certificates," filed on Aug. 7, 2013, which is hereby incorporated by reference in its entirety for all purposes.

BACKGROUND

Reduced latency is critical to all network commerce. Reducing latency may be achieved by various techniques, including for example, reducing the distance of transmission, or the amount of data being transmitted. In the case of secure connections, where a public key certificate is transferred, for example from a server to a client, to establish a secure connection, latency may occur due to the number of transmissions to establish the secure connection as well as the size of certificates and certificate chains exchanged to authenticate the secure connection. To reduce latency, it may be desirable to reduce the number of back and forth communications needed before proceeding with a transmission session, as well reducing the size of data exchanged, including the size of certificates and certificate chains exchanged to establish the secure connection.

SUMMARY

The disclosed subject matter relates to a method for establishing secure connections using compressed cryptographic chaining certificates. The method comprises receiving a first compact representation corresponding to a certificate for validating a first entity at a second entity. The method further comprises retrieving a local list of one or more compact representations corresponding to one or more certificates locally available to the second entity. The method further comprises comparing the first compact representation to the one or more compact representations within the local list. The method further comprises determining if the first compact representation matches at least one of the one or more compact representations. The method further comprises retrieving the certificate corresponding to the at least one of the one or more compact representations if the first compact representation matches the at least one of the one or more compact representations and validating the first entity using the retrieved certificate corresponding to the at least one of the one or more compact representations.

The disclosed subject matter also relates to a system for establishing secure connections using compressed cryptographic chaining certificates. The system comprises one or more processors and a machine-readable medium comprising instructions stored therein, which when executed by the processors, cause the processors to perform operations. The operations comprise receiving a first compact representation corresponding to a certificate for validating a first entity at a second entity. The operations further comprise retrieving one or more compact representations locally available to the second entity. The operations further comprise comparing the first compact representation to the one or more compact representations. The operations further comprise determining if the first compact representation matches at least one of the one or more compact representations. The operations further comprise retrieving a certificate locally available at the second entity and corresponding to the at least one of the one or more compact representations if the first compact representation matches the at least one of the one or more compact representations and establishing a secure connection between the sender and receiver using the retrieved certificate.

The disclosed subject matter also relates to a machine-readable medium including instructions stored therein, which when executed by a machine, cause the machine to perform operations. The operations comprise receiving one or more compact representations corresponding to one or more certificates for validating a first entity at a second entity. The operations further comprise retrieving a local list of one or more compact representations corresponding to one or more certificates locally available to the second entity. The operations further comprise comparing the received one or more compact representations to the one or more compact representations within the local list. The operations further comprise determining if a first compact representation of the received one or more compact representations matches at least one of the one or more compact representations. The operations further comprise retrieving the certificate corresponding to the at least one of the one or more compact representations if the first compact representation matches the at least one of the one or more compact representations and validating the sender using the retrieved certificate corresponding to the at least one of the one or more compact representations.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
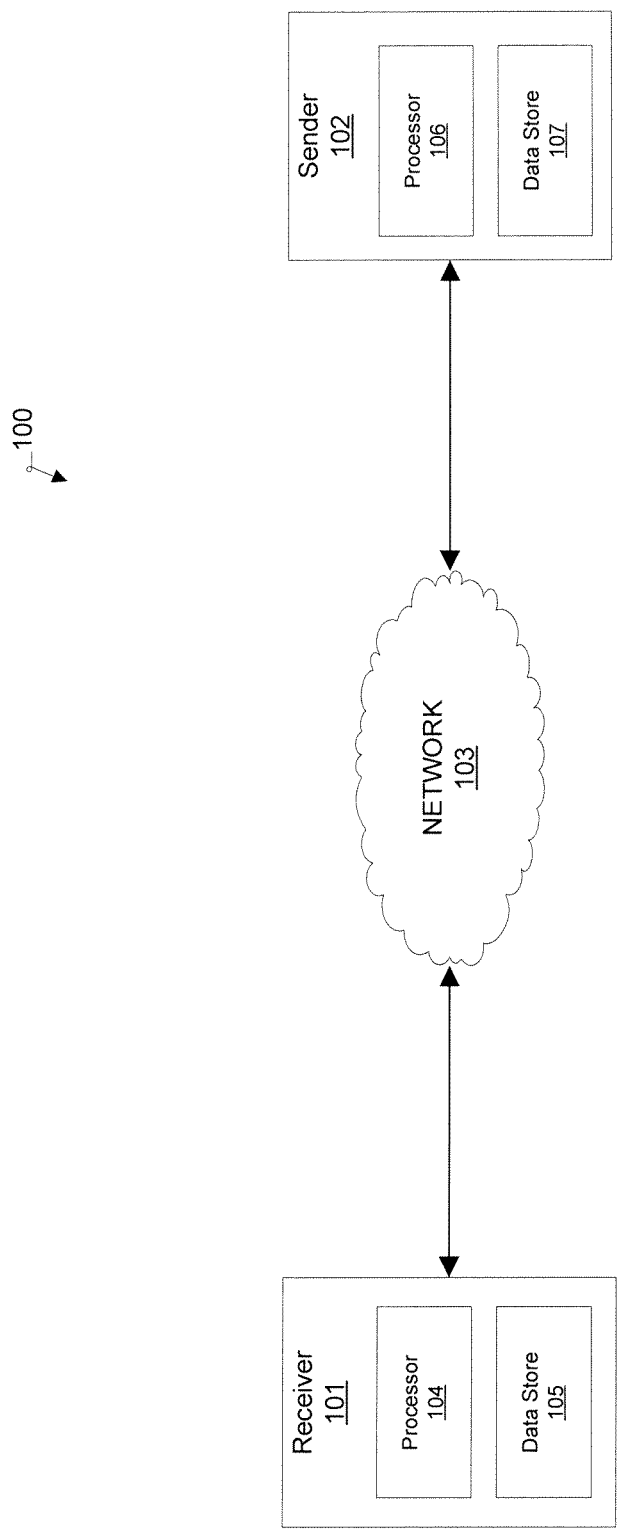
FIG. 1 illustrates an example network environment, which provides for establishing secure connections using compressed cryptographic chaining certificates.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a method and system for reducing latency during the setup of a secure connection. In some instances, when setting up a secure connection, a sender (e.g., server) may provide a copy of the sender public key certificate and/or a chain of certificates that chain the trust from a trusted root CA, held by the receiver (e.g., client), to the public key.

Authentication is crucial to secure communications. Users must be able to prove their identity to those with whom they communicate and must be able to verify the identity of others. Authentication of identity on a network is complex because the communicating parties do not physically meet as they communicate. This can allow an unethical person to intercept messages or to impersonate another person or entity.

A certificate is a set of data that identifies an entity. A trusted organization assigns a certificate to an individual or an entity that associates a public key with the individual. The individual or entity to whom a certificate is issued is called the subject of that certificate. The trusted organization that issues the certificate is a certification authority (CA) and is known as the certificate's issuer. A trustworthy CA will only issue a certificate after verifying the identity of the certificate's subject.

To use certificates for security, the authenticity and validity of the certificate must be verified. A certificate chain consists of all the certificates needed to certify the subject identified by the end certificate. In practice this includes the end certificate, the certificates of intermediate CAs, and the certificate of a root CA trusted by all parties in the chain. Every intermediate CA in the chain holds a certificate issued by the CA one level above it in the trust hierarchy. The root CA typically issues a certificate for itself, and/or acts an intermediate CA that is designated as a trusted root.

The process of verifying the authenticity and validity of a newly received certificate involves checking all of the certificates in the chain of certificates from the original, universally (or explicitly) trusted CA, through any intermediate CAs, down to the certificate just received which is called the end certificate. A new certificate can only be trusted if each certificate in that certificate's chain is properly issued and valid.

Because certificate chains typically include multiple certificates, the process of setting up a connection between two entities is often cumbersome and may require transmittal of large amounts of data. For example, a certificate may be between 1000-1500 bites in size. A sender (e.g., server) may send multiple certificate chains which may cause several kilobytes of data being transmitted. The large size of certificate chains transmitted when verifying a sender leads to one or more latency related problems. First, due to the issues with amplification attacks, which may occur when the sender sends a large amount of data to a falsely provided address, additional authentication of a return address is required before a certificate chain (a large bulk of data) is provided. Furthermore, because certificate chains typically need to be sent in multiple packets, packet loss and latency may occur, when packets are lost and/or retransmitted and/or due to the time it takes to receive all of the multiple packets. Furthermore, sending fewer bytes of total data may reduce "serialization latency" incurred by sending data over a lower bandwidth link.

Latency may be reduced by reducing the size of the data being sent during the secure connection setup process. In one example, the data (e.g., certificate chains) is compressed such that the entire communication can be sent in a specific number of packets (e.g. a single packet). The compressed message may reduce the number of roundtrips before the certificate chain is provided to establish the communication session. In some instances, when establishing a communication session, the risk of an amplification attack is removed, because of the reduced size of certificate chains, and thus the extra communication for authenticating the return address can be avoided.

Furthermore, the compact certificate chains may allow the validation process to be completed sooner. In some instances, a more compressed certificate chain may facilitate receiving the data sooner, even when the compressed certificate is sent in addition to the actual certificate, and thus beginning the process sooner. That is, because the compressed certificate is sent in a reduced number of packets (e.g., single packet), the packet(s) may be received with reduced chances of lost packets and may facilitate faster processing and validation. This reduces latency, including, serialization latency caused by sending a larger number of packets.

To facilitate compact certificate chains, a list of cryptographic certificates used for chaining trust from a sender certificate to a trusted certificate authority (CA) certificate is stored or accessible at the receiver. In one example, the list may be obtained by the receiver in various ways. The list may be received including a listing of certificates and/or built/updated as new certificate chains are provided to the receiver. In one example, each certificate of the list is compressed to generate a compact representation of the certificate (e.g., a hash). For example, a hash function may be applied to each certificate to generate a hash representing the certificate.

In one implementation, when a sender is required to provide a certificate to a receiver in the process of setting up a secure connection, the sender obtains one or more certificates (e.g., certificate chains) and generates a hash of the one or more certificates. The sender then sends the one or more calculated hashes to the receiver. The receiver can compare the provided hashes to a local listing of hashes representing locally available to the receiver (e.g., locally stored or accessible), hereinafter generally referred to as "local list of hashes." If one of the one or more hashes sent by the sender matches a hash within the local list, the receiver can look up the certificate represented by the listed hash. The receiver can then use the obtained certificate to validate the sender and/or set up the secure connection. Thus, in cases where a certificate is locally available at the receiver, the process of setting up a secure connection is expedited.

In one example, the hashes may be sent in lieu of the certificate(s), or may be sent in addition to the certificate(s) (e.g., as a first packet of the communication process). In some instances, if the provided hash resolves to a certificate at the receiver, the process may proceed without needing any other communication. Otherwise, the certificate may be requested (or waited for, if certificates are sent "in addition") and used to set up the connection.

The described embodiments of the present disclosure discuss a connection being set up between a sender and receiver. It should be apparent to one skilled in the art that the described methods can be used when establishing secure connection between any two entities.

In one example (e.g., UDP over QUIC), a certificate may be requested by the receiver to initiate the secure connection.

As described above, to reduce the round trip time and reduce the risk of sending large information to the wrong return address, one or more certificates that need to be transmitted by a server may be replaced with a hash of the corresponding certificate(s), or may be sent in addition to (such as preceding) the corresponding certificate(s).

In some embodiments, the amount of compression, and hence the number of replacements with hashes, may be varied to achieve a target compression threshold. For instance, some or all certificates may be compressed to their hashes so that no more than K packets, such as K==1, are needed to transmit the one or more certificates. In some embodiments, only certain certificates of the one or more certificates may be compressed. For example, the selection of which certificates of the one or more certificates are compressed may be based on a probability of the certificate being recognized by the receiver. For example, certificates that are likely to be included in the list of certificates available to client, and thus, the probability that a client can decode the hash are high, are preferably encoded as their hash, and certificates that are unlikely to be decoded by a client should be less preferably encoded. For example, some chaining certificates are very common on the Internet, and hence the probability that a client will have become familiar with the certificate, and added it to the list of known certificates with corresponding known hashes, may be high. Therefore, such certificates may be compressed ahead of other less known certificates. Such a preference may be employed when compression to achieve an overall threshold which does not necessitate compression of all certificates by a server.

In some implementations, (e.g., an SSL over TCP connection or UDP over QUIC connection when the return address of the receiver is already verified), a list of hashes of certificates may be presented prior to the explicit transmission of the certificates. For example, both hashes and the certificates may be transmitted. The order in which hashes and certificates are transmitted may be varied. In some example, a hash of a certificate may be sent before sending the certificate itself. The compact representation or hashes may be transmitted first, and thus, typically received sooner. Additionally, the redundant transmission of the certificate hash may lead to reduced risk of latency due to packet losses, and hence, reduction in delay. The order in which the certificates are sent may be based on the probability that the client is able to decipher the certificate from the compressed hash. For example, the most likely certificate to be known to a client may be sent last in the explicit list. In this manner, those certificates which are likely to be needed once compressed hashes are deciphered, are sent earlier, leading to less overall delay.

FIG. 1 illustrates an example network environment 100, which provides for establishing secure connections using compressed cryptographic chaining certificates. The network environment 100 may be a client-server network embodiment. A network environment 100 includes a receiver 101 communicably connected to a sender 102 by a network 103.

In some example implementations, receiver 101 can be a server or a computing device such as laptop or desktop computers, smartphones, PDAs, portable media players, tablet computers, or other appropriate computing devices. In some implementations, receiver 101 includes a processing device 104 and a data store 105. Processing device 104 executes computer instructions stored in data store 105, for example, to facilitate establishing secure connections using compressed cryptographic chaining certificates. In one example, data store 105, may further store a list of local hashes and/or corresponding to a list of known certificates.

In some implementations, sender 102 can be a server or a computing device. In some example aspects, sender 102 includes a processing device 106 and a data store 107. Processing device 106 executes computer instructions stored in data store 107, for example, to facilitate establishing secure connections using compressed cryptographic chaining certificates. In one example, processing device 106 may be configured to generate hashes ("hash") corresponding to one or more certificate chains. Sender 102 may be coupled with various remote databases or storage services. It should be understood that the functions performed by sender 102 may be performed within a single server, or across multiple servers.

Network 103 can be a wired or wireless network. Network 103 can be a public communication network (e.g., the Internet, cellular data network, dialup modems over a telephone network) or a private communications network (e.g., private LAN, leased lines). Network 103 can include, for example, any one or more of a personal area network (PAN), a local area network (LAN), a campus area network (CAN), a metropolitan area network (MAN), a wide area network (WAN), a broadband network (BBN), the Internet, and the like. Network 103 can include, but is not limited to, any one or more of the following network topologies, including a bus network, a star network, a ring network, a mesh network, a star-bus network, a tree or hierarchical network, and the like.

Communications between the receiver 101 (e.g., client) and sender 102 (e.g., server) may be facilitated through the QUIC, TCP/IP, HTTP, XMPP or other communication protocol, using SSL, UDP or other secure cryptographic protocols to facilitate secure connection.

Secure communication with a secure cryptographic protocol is facilitated using public cryptographic keys. Often, the sender (e.g., sender 102) provides a public key to be used by the receiver (e.g., receiver 101) to decrypt encrypted messages sent from the sender and signed using the sender's public key. To authenticate the source of the key, a key is typically preceded or accompanied by a certificate. In one example, the sender 102 is configured to generate a hash of one or more certificate chains being sent to the receiver 101 to set up a secure connection. In some implementations, the receiver 101 is configured to receive the one or more hashes, and compare the hashes to a listing of local hashes. The local hashes each correspond to a certificate chain locally available at the receiver 101. If one of the one or hashes matches a local hash, the corresponding certificate is retrieved by the receiver 101 and used to set up the secure connection. Otherwise, in some implementations, the receiver 101 may request and/or receive the certificate chain from the sender 102 and use the received certificate chain to set up the secure connection. In some implementations, after the certificate is received and the sender is authenticated, the sender public key, for example, provided as part of the certificate chain, or following the authentication of the sender 102, may then be used by the receiver to decrypt content provided by the sender 102.

While, the sender 102 is described as providing the certificate and key, the functionalities may be performed across several different applications. In one example, a certificate server may provide the certificate and/or public key on behalf of the sender 102. For example, a CA running on a secure computer manages the certificate server that has access to the public key of all its clients including the sender. The certificate server dispenses a message that contains the public key of one of its client users (e.g., sender 102). Each certificate is signed with the CA's private key. Thus the receiver of such a certificate can verify that a specified CA sent it.

Figure 2:
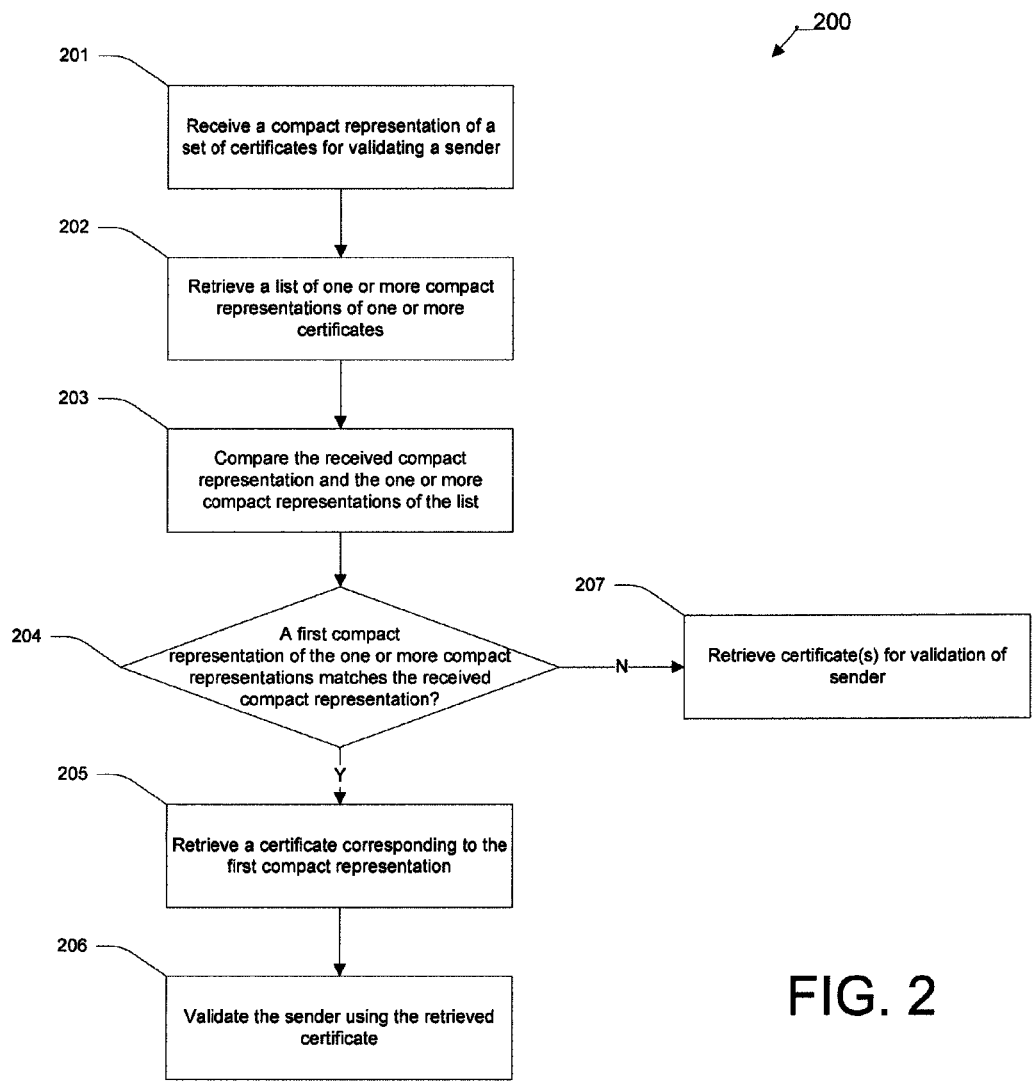
FIG. 2 illustrates a flow diagram of an example process for establishing secure connections using compressed cryptographic chaining certificates.

FIG. 2 illustrates a flow diagram of an example process 200 for establishing secure connections using compressed cryptographic chaining certificates. In step 201, a receiver (e.g., a client application or server) being on the receiving end of a secure connection (e.g., receiver 101) receives a compact representation of a set of certificates for validating a sender (e.g., sender 102). In some embodiments, when a server or application sending content (e.g., sender 102) is required to specify a list of certificates, one or more certificates may be compressed, and the compressed representations specified instead of, or in addition to, the actual certificate. For example, the list of certificates may be compressed via a cryptographic hash function to a unique value, commonly referred to as the hash, or fingerprint. Examples of cryptographic hashes include MD5, SHA1, and SHA256. In some examples, when using such hashes as a representation of a certificate, the sender speculates that a client will be able to decipher one of more of the hashes. An example process for sending compressed certificates from a server is described in further detail below with respect to FIG. 3.

In step 202, a list of one or more compact representations of one or more certificates is retrieved by the receiver. In some embodiments, the receiver may acquire a set of cryptographic certificates that are used for chaining trust from sender (e.g., server) certificate to trusted certificate authority (CA) certificates. In some embodiments, the list may be acquired explicitly, such as by contacting a service to get a list, and/or by using a list included in the distribution of software, such as operating system distributions, or application distributions, such as a browser application. In some embodiments, the additions to the list may be acquired incrementally, such as be persisting chaining certificates that are used during connection establishments. For example, chaining certificates may be routinely provided during connection establishment, and they may be preserved. In another example, updated lists and/or updates to the existing list may be periodically made by a service, system administrator and/or other entity.

In some embodiments, one or more certificates in the list may be compressed via a cryptographic hash function to a unique value, commonly referred to as a hash, or fingerprint. Examples of cryptographic hashes include MD5, SHA1, and SHA256. The receiver may thus, have a list of hashes. In some embodiments, when a client receives a hash of a certificate, it may be translated by the client to be equivalent to an original certificate of the local list of certificates.

In step 203, the one or more compact representations of the set of certificates received in step 201 are compared to the compact representations of the list. Based on the comparison, in step 204, it is determined if a first compact representation of the one or more compact representations of the list match one of the one or more received compact representations.

If so, in step 205, the certificate corresponding to the first compact representation is retrieved. In some implementations, as described above, each compact representation in the list corresponds to a certificate in the list of certificates available to the receiver. In step 205, when a hash is recognized as being a compact representation corresponding to a known certificate, the certificate corresponding to the hash is identified and retrieved. In step 206, the retrieved certificate is used to validate the sender.

Otherwise, if in step 204, it is determined that the received compact representations do not match any of the compact representations corresponding to a known certificate in the list, in step 206, the certificate or certificate chain may be retrieved via other means to validate the server. For example, the receiver may wait until the explicitly stated certificate arrives and/or or by sending a request for the transmission of the explicit certificate.

Figure 3:
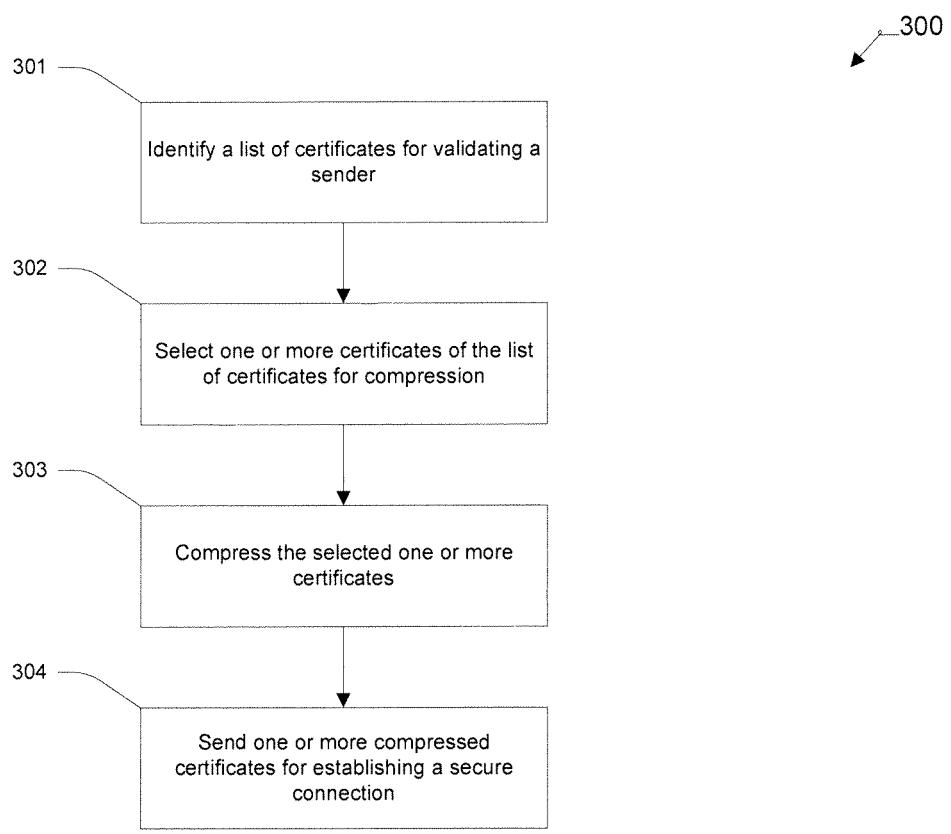
FIG. 3 illustrates a flow diagram of an example process for providing compressed cryptographic chaining certificates for establishing a secure connection.

FIG. 3 illustrates a flow diagram of an example process 300 for providing compressed cryptographic chaining certificates for establishing a secure connection. In step 301, a list of certificates to establish a trusted chain of certificates from a sender (e.g., a server or application sending content such as sender 102) certificate to a trusted root is identified.

In step 302, one or more of the certificates of the list of certificates are selected for compression. In one example, the selected one or more certificates may include those certificates that are likely to be recognized by the sender as described above. In some implementations, all of the certificates of the list of certificates may be selected for compression.

In step 303, the selected one or more certificates are compressed. For example, the list of certificates may be compressed via a cryptographic hash function to a unique value, commonly referred to as the hash, or fingerprint. Examples of cryptographic hashes include MD5, SHA1, and SHA256. In some examples, when using such hashes as a representation of a certificate, the sender speculates that a receiver will be able to decipher one of more of the hashes.

In step 304, the one or more compressed certificates (hashes) are sent to a receiver for establishing a secure connection. In one example, in addition to the compressed certificates, one or more actual certificates may also be sent in step 304 (e.g., concurrently, before and/or following sending the compressed certificates). In some examples, actual certificates may only be sent for certificates identified in step 301 and not compressed in steps 302 and 303. In another example, one or more certificates of the list of certificates are identified (e.g., certificates with a certain likelihood of not being decipherable at the receiver using hashes) and sent in addition to hashes. In another example, all actual certificates for the list of certificates identified in step 301 may be sent to the receiver. In some examples, during step 304, one or more compressed certificates and/or actual certificates may be selected for sending (e.g., according to a byte limit, bandwidth limit, etc.).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
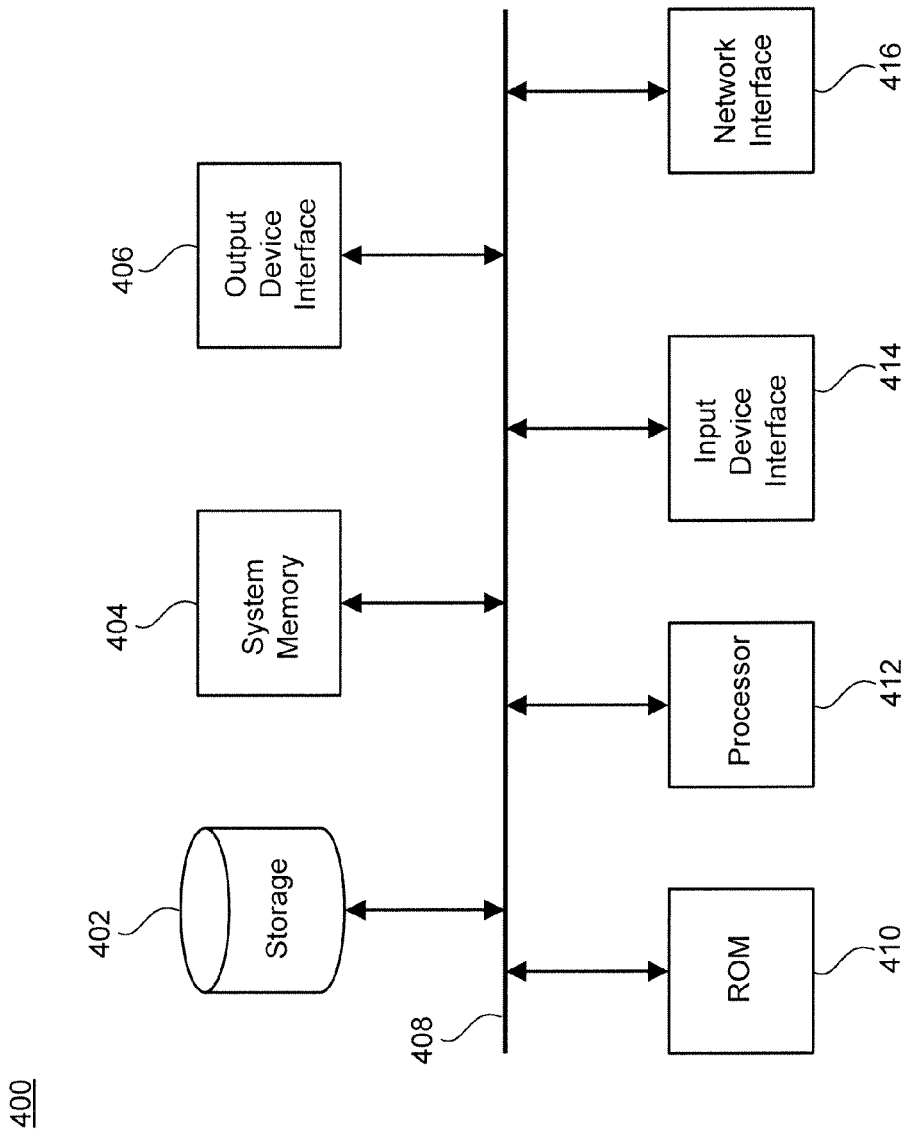
FIG. 4 conceptually illustrates an electronic system with which some implementations of the subject technology are implemented.

FIG. 4 conceptually illustrates an electronic system with which some implementations of the subject technology are implemented. Electronic system 4400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime.

In some implementations, the processes of the subject disclosure are stored in system memory 404, permanent storage device 402, and/or ROM 410. For example, the various memory units include instructions for establishing secure connections using compressed cryptographic chaining certificates. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for establishing secure connections using compressed cryptographic chaining certificates, the method comprising:

receiving a first compact representation corresponding to a first certificate of a certificate chain along with a second certificate of the certificate chain for validating a first entity at a second entity, the first certificate differing from the second certificate and the first certificate having been determined by the first entity as having a higher probability than the second certificate of having been previously received and stored at the second entity;

retrieving a local list of one or more compact representations corresponding to one or more certificates locally available to the second entity;

comparing the first compact representation to the one or more compact representations within the local list;

determining if the first compact representation matches at least one of the one or more compact representations;

retrieving the first certificate corresponding to the at least one of the one or more compact representations if the first compact representation matches the at least one of the one or more compact representations; and validating the first entity using the certificate chain including the retrieved first certificate corresponding to the at least one of the one or more compact representations and the received second certificate.

2. The method of claim 1, wherein the first compact representation is a hash generated by applying a hash function to the first certificate.

3. The method of claim 1, further comprising:
retrieving the first certificate for validating the first entity if the first compact representation does not match at least one of the one or more compact representations.

4. The method of claim 1, further comprising:
retrieving the one or more certificates locally available to the second entity; and
generating the local list by generating a hash of each of the one or more certificates by applying a hash function to each of the one or more certificates.

5. The method of claim 1, wherein the first compact representation is sent together with the first certificate for validating the first entity.

6. The method of claim 1, wherein the first compact representation is sent in lieu of the first certificate for validating the first entity.

7. The method of claim 6, wherein a return address of the second entity is not verified by the first entity.

8. The method of claim 1, further comprising:
establishing a secure connection between the first entity and second entity in response to validating the first entity.

9. The method of claim 8, wherein the secure connection is a secure cryptographic connection.

10. The method of claim 8, wherein the secure connection is a SSL over TCP connection.

11. The method of claim 8, wherein the secure connection is a UDP over QUIC connection.

12. The method of claim 1, wherein the first entity comprises a server and the second entity comprises a client application.

13. A system for establishing secure connections using compressed cryptographic chaining certificates, the system comprising:
one or more processors; and
a machine-readable medium comprising instructions stored therein, which when executed by the processors, cause the processors to perform operations comprising:
receiving a first compact representation corresponding to a first certificate together with a second certificate for validating a first entity at a second entity, the first certificate having been determined by the first entity as having a higher probability than the second certificate of having been previously stored at the second entity;
retrieving one or more compact representations locally available to the second entity;
comparing the first compact representation to the one or more compact representations;
determining if the first compact representation matches at least one of the one or more compact representations;
retrieving the first certificate locally available at the second entity and corresponding to the at least one of the one or more compact representations if the first compact representation matches the at least one of the one or more compact representations; and
establishing a secure connection between the first entity and the second entity based at least in part on the retrieved first certificate and the received second certificate.

14. The system of claim 13, wherein the establishing comprises:
validating the first entity using the retrieved first certificate corresponding to the at least one of the one or more compact representations and the received second certificate.

15. The system of claim 14, the operations further comprising:
retrieving the first certificate if the first compact representation does not match at least one of the one or more compact representations.

16. The system of claim 13, wherein the first compact representation is a hash generated by applying a hash function to the first certificate.

17. The system of claim 13, the operations further comprising:
retrieving a list of certificates comprising one or more certificates; and
generating one or more compact representations by applying a hash function to each of the one or more certificates.

18. The system of claim 13, the operations further comprising:
receiving the first certificate if the first compact representation does not match at least one of the one or more compact representations.

19. A non-transitory machine-readable medium comprising instructions stored therein, which when executed by a machine, cause the machine to perform operations comprising:
receiving compact representations corresponding to all certificates in a complete certificate chain for validating a first entity at a second entity without receiving any certificates of the certificate chain with the compact representations;
retrieving a local list of one or more compact representations corresponding to one or more certificates locally available to the second entity;
comparing each of the received compact representations of the certificates to the one or more compact representations within the local list;
retrieving the certificates of the certificate chain that correspond to the compact representations; and
validating the first entity using the retrieved certificates of the certificate chain that correspond to the compact representations.

20. The non-transitory machine-readable medium of claim 19, the operations further comprising:
establishing a secure connection between the first entity and the second entity in response to validating the first entity using the retrieved certificates of the certificate chain.

* * * * *